(12) United States Patent
Naess et al.

(10) Patent No.: US 8,852,330 B2
(45) Date of Patent: Oct. 7, 2014

(54) SEPARATOR TANK FOR SEPARATING OIL AND GAS FROM WATER

(75) Inventors: Jan Thore Naess, Porsgrunn (NO); Finn Beckmann, Porsgrunn (NO)

(73) Assignee: Schlumberger Norge AS, Stavanger (NO)

( * ) Notice: Subject to any disclaimer, the term of this patent is extended or adjusted under 35 U.S.C. 154(b) by 475 days.

(21) Appl. No.: 13/378,842

(22) PCT Filed: Jun. 17, 2010

(86) PCT No.: PCT/IB2010/001482
§ 371 (c)(1),
(2), (4) Date: Feb. 14, 2012

(87) PCT Pub. No.: WO2010/146455
PCT Pub. Date: Dec. 23, 2010

(65) Prior Publication Data
US 2012/0132079 A1   May 31, 2012

(30) Foreign Application Priority Data
Jun. 17, 2009   (EP) .................................... 09163002

(51) Int. Cl.
*B01D 19/00* (2006.01)
*B01D 17/02* (2006.01)

(52) U.S. Cl.
CPC ........ *B01D 19/0057* (2013.01); *B01D 17/0217* (2013.01)
USPC ................... 96/156; 96/174; 96/182; 96/183; 96/212

(58) Field of Classification Search
None
See application file for complete search history.

(56) References Cited

U.S. PATENT DOCUMENTS

| 4,072,614 | A | 2/1978 | Harris |
| 4,376,676 | A | 3/1983 | Gill |
| 4,447,322 | A | 5/1984 | Zajdlik |
| 2009/0173232 | A1* | 7/2009 | Folkvang ........................ 96/183 |

FOREIGN PATENT DOCUMENTS

| EP | 1 779 911 | 5/2007 |
| GB | 312 287 | 8/1930 |
| GB | 851 471 | 10/1960 |
| GB | 1 324 361 | 7/1973 |

* cited by examiner

*Primary Examiner* — Duane Smith
*Assistant Examiner* — Phillip Shao
(74) *Attorney, Agent, or Firm* — Baker Hostetler

(57) ABSTRACT

A separator tank (1) for separating oil and gas from water comprises an essentially cylindrical vertical tank with at least one separator tank unit. The separator tank unit has an inlet for fluid (2) and a first inner annular wall (5) a first conical portion (9) and a first central opening (8). A second inner annular wall (15) is positioned at a distance from the first inner annular wall and has a second conical portion (19) and a second central opening (18). A first flow opening (10) is provided at an end of said first inner annular wall (5) and a second flow opening (20) is provided at an end of second inner annular wall (15).

29 Claims, 6 Drawing Sheets

SEPARATOR TANK FOR SEPARATING OIL AND GAS FROM WATER

Figure 1:
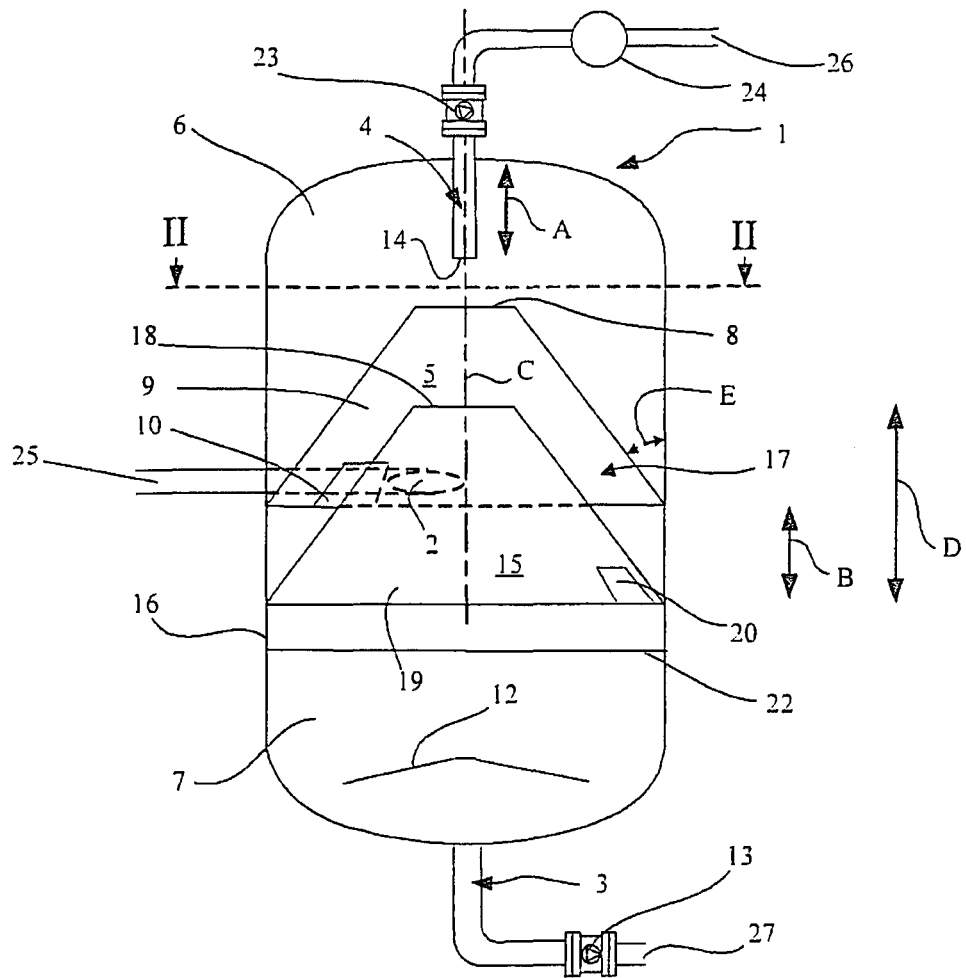

This is a national stage of PCT/IB10/001482 filed Jun. 17, 2010 and published in English, which claims the priority of European number 09163002.0 filed Jun. 17,2009, hereby incorporated by reference.

The present invention relates to a separator tank for separating oil and gas from water, and comprising an essentially cylindrical vertical tank with at least one separator tank unit, which separator tank unit has an inlet for fluid and a first inner annular wall, at least one first outlet in the upper part of the separator tank unit, and at least one second outlet in the lower part of the separator tank unit, said inlet for fluid being tangentially directed along the inside of a cylindrical sidewall of the tank; and; and said first inner annular wall extending from the cylindrical sidewall of the tank and having a first conical portion and a first central opening at an end of said first inner annular wall and a first flow opening.

A separator tank of this kind is known from WO 2007/049246, where the first conical portion extends from the wall of the tank at a location just below the inlet for fluid and upwards to the first central opening. Connections in series or connections in parallel of several separator tanks are described. WO 2007/049245 also describes a separator tank, where a central vortex-breaker is present in the single separator tank unit, and series or parallel connection of several separator tanks are described.

The separator tanks are used to remove small amounts of oil from a main flow of water. The main flow of water is typically a result of production of crude oil after the initial separation of oil from the fluid flow coming from the wellhead. The initial separation may take place in one or more stages, and the water flow separated off from the oil will contain small amounts of oil and gas, such as 100 mg oil per liter of water (100 ppm oil) or even less oil, such as 50 mg oil per liter of water (50 ppm oil). Although these amounts of oil may seem small, it is for environmental reasons an advantage if they may be further reduced before the water is discharged into a suitable recipient, such as the sea, or into a reservoir. In addition to purifying the water before it is discharged, the separator tanks provide the distinct advantage that the recovered oil can be utilized. And in this respect a rather high degree of purification can be advantageous also in cases where the water is to be re-injected into the oil field formation.

An object of the present invention is to obtain a high degree of removal of gas bubbles from the water before the water flows through the second outlet.

With a view to this, the initially mentioned separator tank according to the present invention is characterized in that the separator tank unit has a second inner annular wall positioned in the separator tank unit at a distance from the first inner annular wall and extending from the cylindrical sidewall of the tank, which second inner annular wall has a second conical portion, a second central opening at an end of the second inner annular wall, and a second flow opening at the lower end of the second inner annular wall.

The first inner annular wall and the second inner annular wall together form a double-walled cone structure where a conical, annular, intermediate volume is present in between the first conical portion and the second conical portion. Fluid flowing down through the first flow opening enters the intermediate chamber and flows in a vortex flow therein. This vortex flow is an additional vortex flow to the vortex flows in the upper part and the vortex flow in the lower part of the separator tank. The vortex flow in the intermediate volume causes an effective coalescence of minor gas bubbles present in the flow. As the bubbles become larger they will rise upwards and seek the upper part of the separator tank. When the water flows down through the second flow opening and into the vortex flow in the lower part of the separator tank, then the gas content in the water is lower than in the water flowing through the first flow opening.

In an embodiment the first inner annular wall has a first annular radial portion extending from the first conical portion to a cylindrical sidewall of the separator tank unit. The radial portion has the effect to create distance in the radial direction between the large diameter end of the first conical portion and the cylindrical sidewall, thus leaving space for the vortex flow at this area of the first conical portion. The more vigorous flow at the large diameter end intensifies the vortex flow along the conical portion and thus the efficiency of the separation.

In a further development of the latter embodiment the first flow opening is located in the first annular radial portion. With this location of the first flow opening the full area of the first conical portion is utilized as guide surface for the vortex flow, which stabilizes the vortex flow. The gas and oil in the water seek towards the centre of the separator tank unit and will consequently have a higher concentration near the surface of the conical portion. When the and first flow opening is located in the first annular radial portion, the gas and oil collected near the surface of the first conical portion will have less tendency to flow through the first flow opening and larger tendency to flow upwards along the first conical portion. The part of the vortex flowing through the first flow opening is thus taken from the radial outermost area of the vortex flow, where the water content is the highest, and at the end of the vortex flow adjacent to the first annular portion where the diameter of the first conical portion is the largest and thus the velocity in the flow the highest, and the forces separating oil and gas from the water thus also the highest.

In an alternative embodiment the first flow opening is located in the first conical portion. With this location of the first flow opening, some of the oil and gas concentrated near the surface of the first conical portion will flow with the water through the first flow opening and be present in the intermediate vortex flow where the gas bubbles can assist in capturing oil and can increase coalescence of minor gas bubbles present in the intermediate vortex flow.

In a preferred embodiment the second inner annular wall has a second annular radial portion extending from the second conical portion to the cylindrical sidewall. Although it is possible to use an annular radial portion on only the first conical portion, it is preferred that the second annular radial portion connects the second conical portion with the cylindrical sidewall which helps obtaining the most vigorous flow at the large diameter end of the second conical portion and a general intensification of the vortex flow along the second conical portion. A special advantage in obtaining high efficiency of the separation in the intermediate vortex flow occurring between the first conical portion and the second conical portion is the resulting low contents of gas and oil in the water flowing through the second flow opening. This makes it possible to reduce the height of the separator tank unit in comparison with the prior art separator tanks. Although it is possible to use an annular radial portion on only the second conical portion, it is preferred that the separator tank unit is embodied with the first annular radial portion extending from the first conical portion and with the second annular radial portion extending from the second conical portion.

In an embodiment the second flow opening is located in the second annular radial portion. With respect to the advantages of this location of the second flow opening reference is made to the above explanation of the advantages of locating the first flow opening in the first annular radial portion. This location of the second flow opening provides similar advantages with respect to the intermediate vortex flow.

Alternatively, the second flow opening can be located in the second conical portion, such as in embodiments where the second conical portion extends to the conical sidewall.

In a preferred embodiment the first and second inner annular walls are substantially identical in size and shape, which leads to ease of manufacture and maintenance, and to flow conditions that are more uniform.

In an embodiment the first flow opening is positioned in the circumferential direction in the range from 110 to 355° downstream after the inlet for fluid. Although it is possible to locate the first flow opening less than 110° downstream of the inlet for fluid, the location at larger distance from the inlet provides the advantage that the energy in the inflowing fluid is better utilized to enforce the vortex flow. It is also possible to let the first flow opening be positioned partly or wholly at the same circumferential position as the inlet for fluid, which may e.g. be practical if there is a separation in height between the inlet for fluid and the first flow opening, but when the inlet for fluid is located close to the first flow opening in at the direction of height, the first flow opening should preferably not overlap with the inlet, as this could cause an undesirable ejector effect from inflowing fluid creating a low pressure above the first flow opening.

In a preferred embodiment the second flow opening is positioned in the circumferential direction in the range from 110 to 355° downstream after the first flow opening. The fluid streaming down through the first flow opening acts to maintain a vigorous intermediate vortex flow when it is forced to flow in the circumferential direction through a distance without possibility for flowing through the second flow opening. Although the second flow opening may be located closer than 110° to the first flow opening, it is preferably located at least 110° downstream from the first flow opening, and suitably at least 260° downstream from the first flow opening.

In an embodiment a baffle plate is mounted at a distance from the second flow opening. The baffle plate causes a change in direction of the flow through the second flow opening, thus promoting a vortex flow in the lower part of the separator tank unit between the second conical portion and the second outlet.

In another embodiment a baffle plate is mounted at a distance from the second flow opening, which baffle plate is an annular ring extending in radial direction from the sidewall. The annular ring is particularly effective in promoting a vortex flow in the lower part of the separator tank unit between the second conical portion and the second outlet, because the fluid flow from the second flow opening is seeking the sidewall of the separator tank unit and is forced into the vortex flow when the annular ring prevents downward flow in the area in vicinity of the sidewall.

Preferably, the vertical distance between the first inner annular wall and the second inner annular wall is less than the vertical extension of the second inner annular wall. The second inner annular wall will consequently protrude up into the inner area enclosed by the first inner annular wall, and the volume of the conical, annular, intermediate area between the two inner annular walls becomes relatively small so that the velocity of the intermediate vortex flow is effective. If a smaller vertical distance, and thus a smaller volume, is selected, then the velocity of the intermediate vortex flow tends to be higher.

In an embodiment the vertical distance between the first inner annular wall and the second inner annular wall is in the range from 0.5 to 5 times the radial width of the first annular radial portion. If the vertical distance is less than half the radial width of the first annular radial portion the distance between the first conical portion and the second conical portion becomes so small that flow resistance resulting from friction could become too large. If the vertical distance is larger than five times the radial width of the first annular radial portion the distance between the first conical portion and the second conical portion becomes so large that the velocity in the intermediate vortex flow is too small.

In an embodiment the second inner annular wall is fixed to the cylindrical sidewall of the tank at a position located at a distance above the bottom of the tank in the range of ⅙-½ of the total inner height of the tank, preferably in the range of ⅕ to ⅖ of the height. The space within the tank below the inner annular wall is a relatively open space where possibly retained gas is allowed some time to rise upwards.

It is possible to let the flow rate from the first outlet vary without control, but for the sake of an optimized capacity of the separator tank and in order to obtain a relatively high amount of oil in the flow out of the first outlet, it is preferred that the separator tank unit has a flow rate control valve for controlling flow from the first outlet of the separator tank unit. Setting of the flow rate allows for adjustment of the ratio between oil and gas in the flow through the first outlet. A too high flow rate may cause outflow of too much gas and a consequent too small amount of oil in relation to gas in the outflow. A too low flow rate may cause a lowering of the liquid level in the separator tank unit and a consequent failing through flow and dropping capacity of the separator tank.

In a preferred embodiment the separator tank has a pressure control device that controls the pressure at the first outlet to be lower than the pressure at the second outlet. The pressure control device may be located at the separator tank or in the system downstream of the first outlet for oil and gas. When the separator tank is in operation, the liquid level within the individual separator tank unit is rising and lowering in a pulsating manner around the first outlet for oil and gas, and when the pressure at the separator tank unit's first outlet for oil and gas is lower than the pressure at the second outlet for water, and preferably at least 0.2 bar lower, suitably about 0.4 bar lower, then the amplitude in the pulsating liquid level change is smaller, and as a result the amount of water flowing out together with the oil is reduced. When the pressure is controlled on the downstream side of the separator tank, such as by controlling the pressure in a downstream reject tank, the pressure is controlled for the separator tank as a whole, also when the separator tank includes two or more separator tank units.

Figure 2:
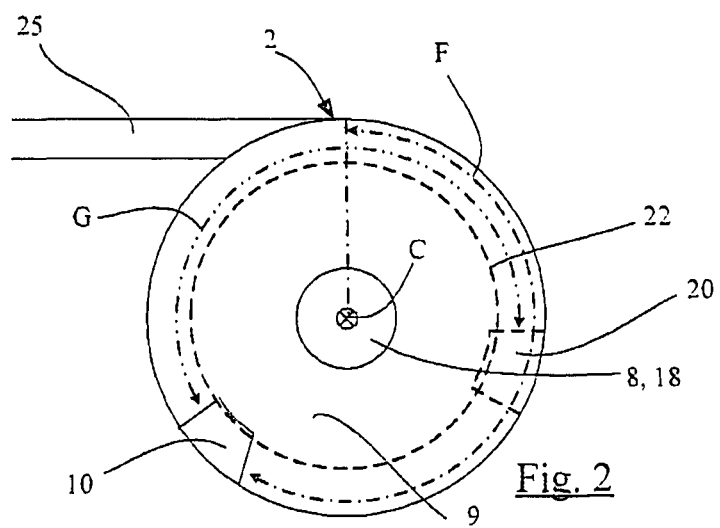
Figure 3:
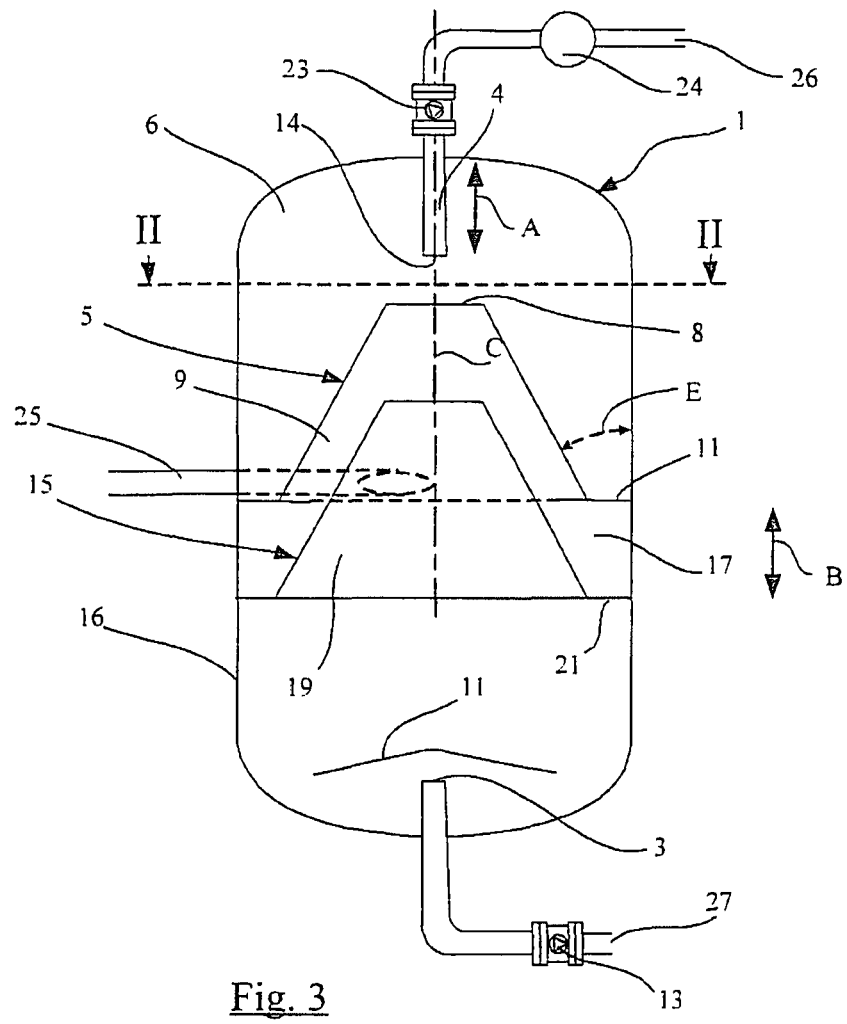
Figure 4:
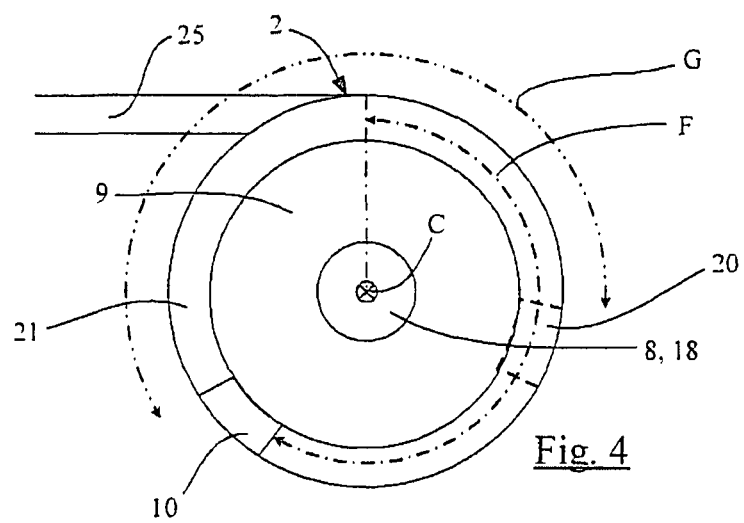
Figure 5:
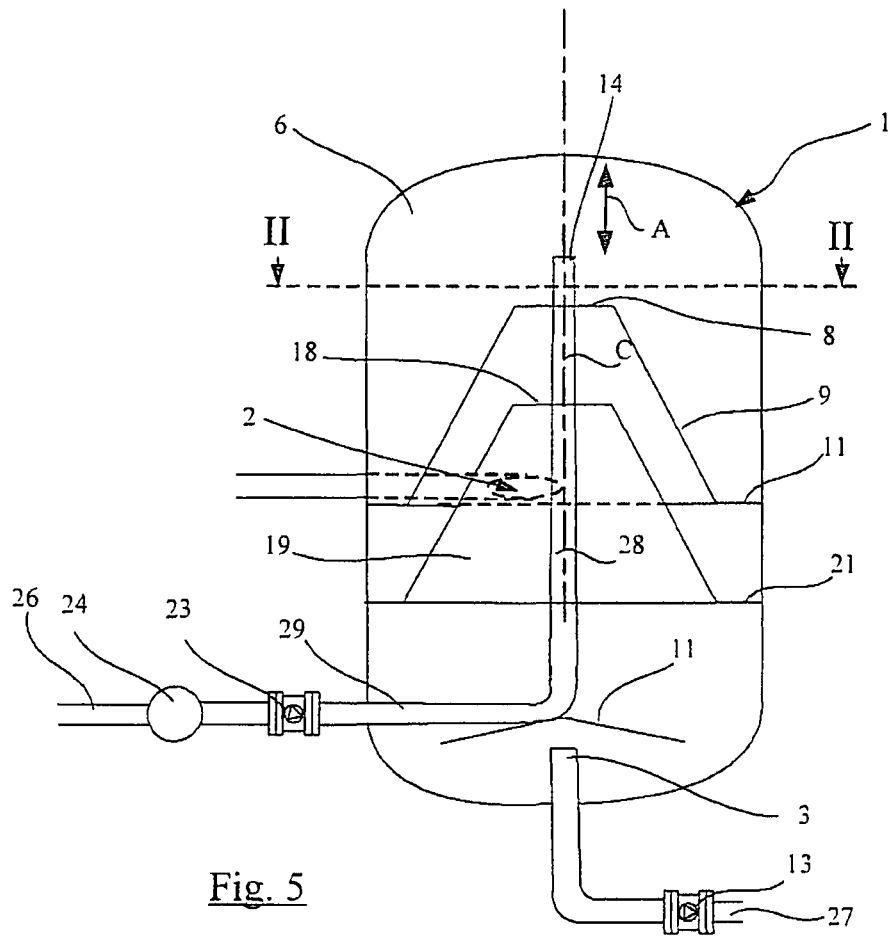
Figure 6:
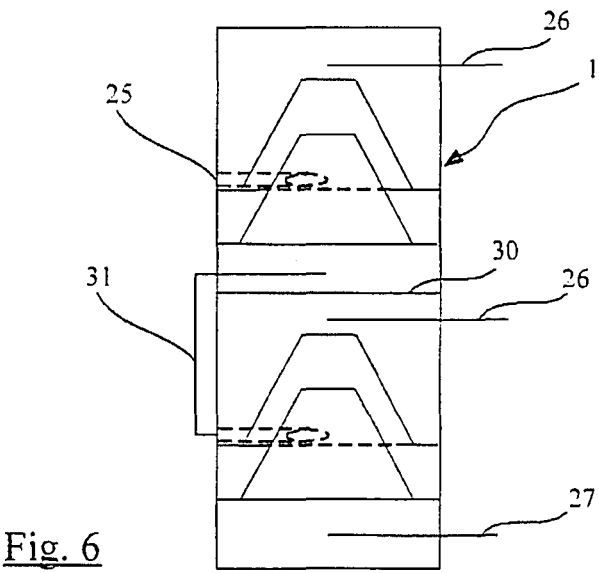
Figure 7:
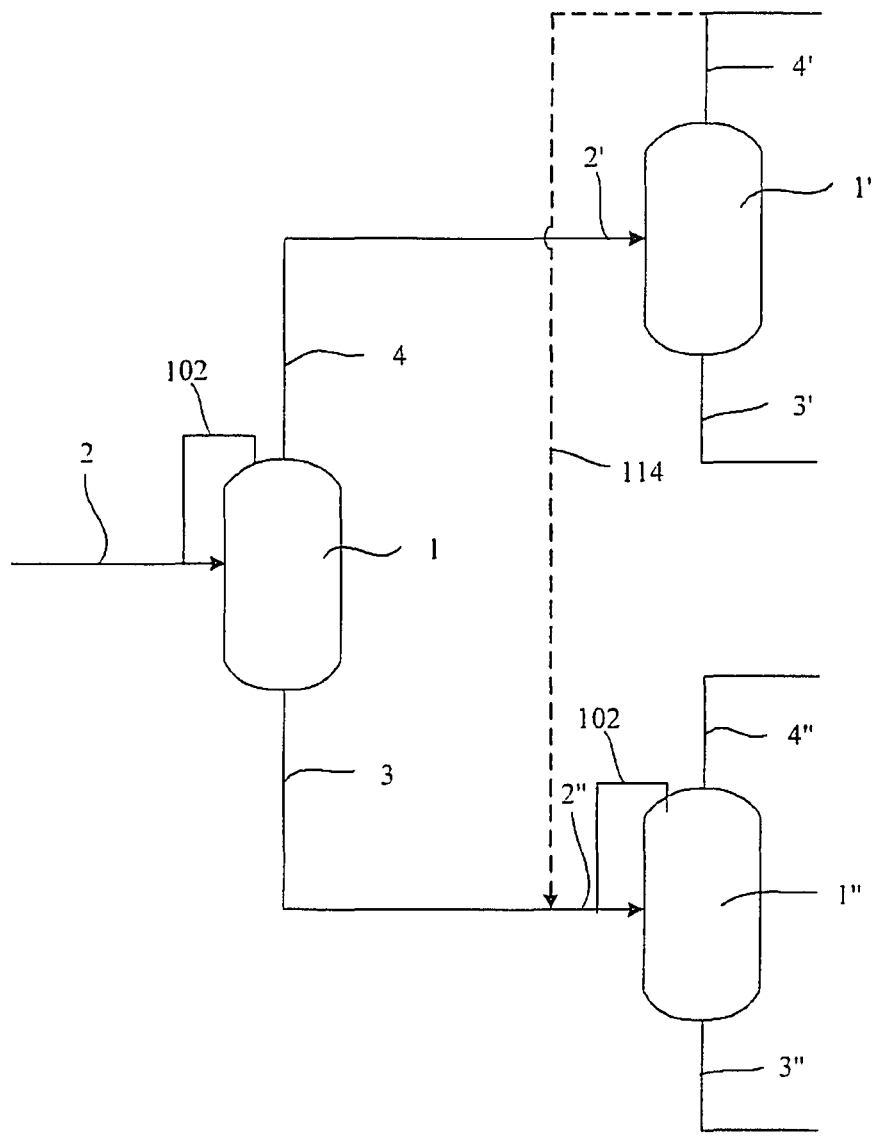
Figure 8:
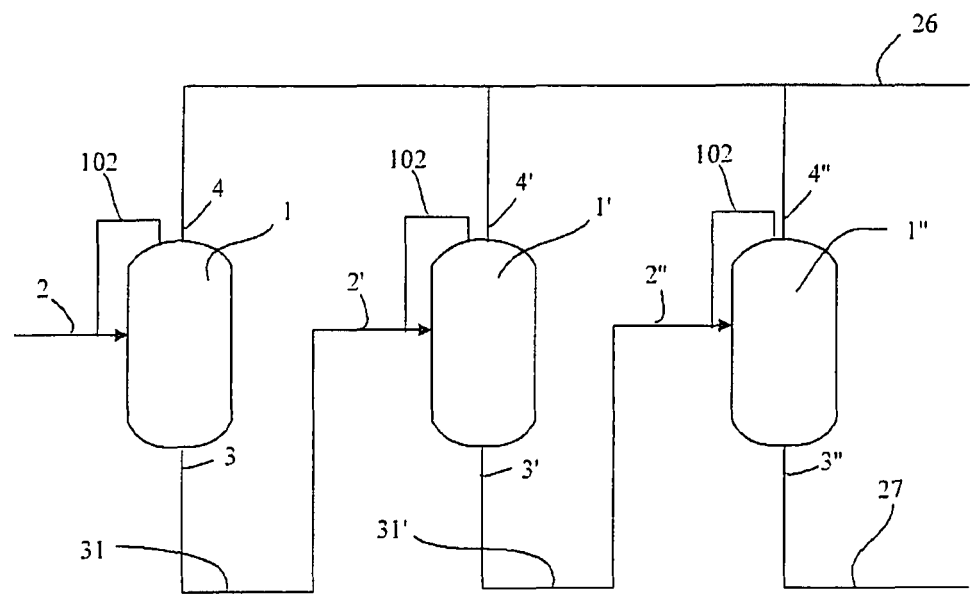
Figure 9:
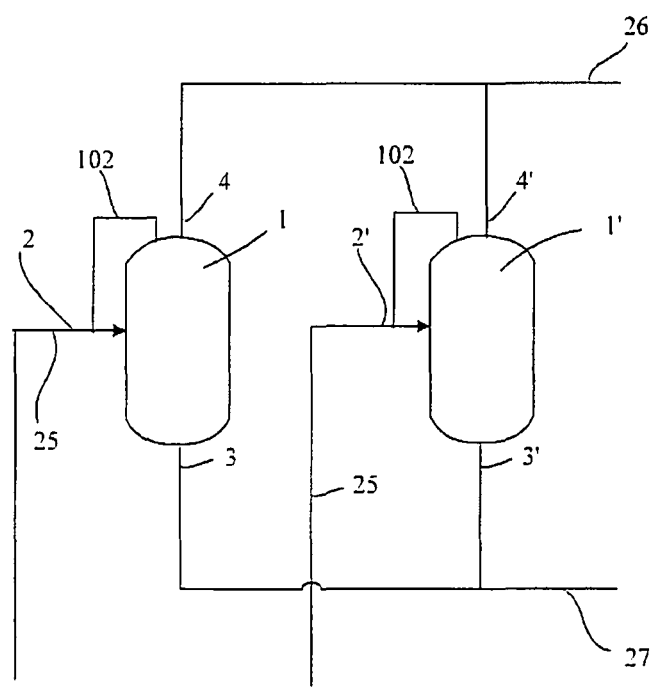
Figure 10:
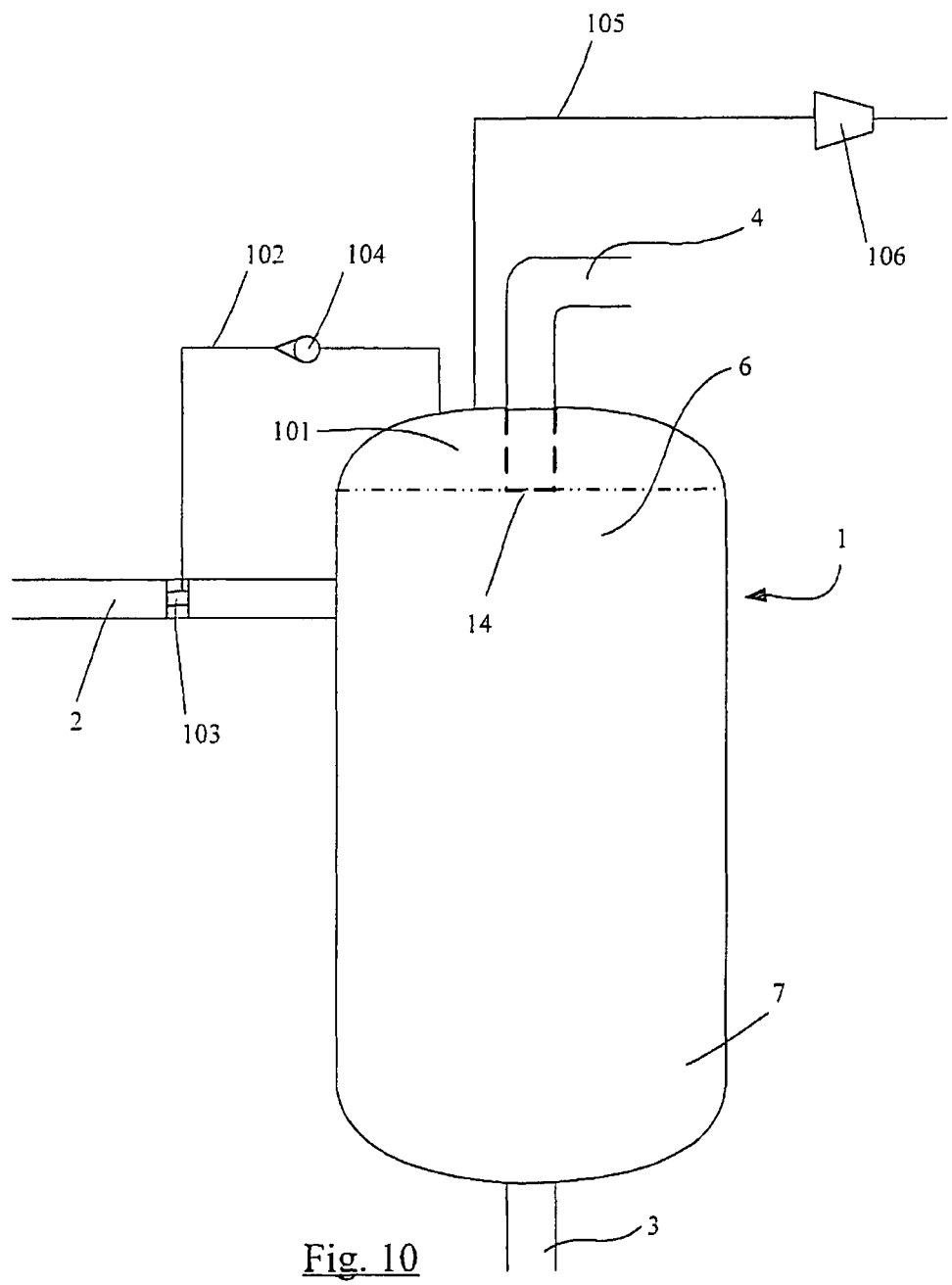

Examples of embodiments of the present invention are described in the following in more detail with reference to the illustrative and schematic drawings, in which FIG. 1 is an illustration of a separator tank according to the present invention, FIG. 2 is a cross-section along the line II-II through the separator tank of FIG. 1, FIGS. 3 and 4 are illustrations like FIGS. 1 and 2 of a second embodiment of the separator tank, FIG. 4 is an illustration of a third embodiment of the separator tank in FIG. 1, FIG. 5 is an illustration like FIG. 1 of a third embodiment, FIG. 6 is an illustration of a separator tank according to the present invention with two separator tank units arranged on top of one another, FIGS. 7-9 are illustrations where three separator tanks are used in series or in parallel, and FIG. 10 is an illustration showing gas injection to the inlet fluid.

A separator tank for separating oil and gas from water, generally designated 1 in FIG. 1, is a substantial cylindrical tank having a separator tank unit with a tangentially arranged inlet 2 for fluid, such as a mixture comprising at least 95% water and some oil and gas that are to be cleaned from the water. The separator tank unit has a first outlet 4 in an upper part 6 of the unit and a second outlet 3 at a lower part 7 of the unit. The separator tank unit has a cylindrical sidewall 16, and below the level of inlet 2 a first inner annular wall 5 is extending from the cylindrical sidewall and inwards and upwards in a first conical portion 9 terminating in a first central opening 8 at the upper end of the first conical portion. The first central opening 8 allows fluid flow communication between the upper part 6 located above first inner annular wall 5 and the lower part of the separator tank unit located below first inner annular wall 5. Such a separator tank can also be named a hydro cyclone or a Compact Floatation Unit (CFU).

A second inner annular wall 15, which is substantially identical in size and shape to the first inner annular wall, is positioned in the separator tank unit at a vertical distance B below the first inner annular wall. The second inner annular wall has a second conical portion 19 terminating in a second central opening 18 at the upper end of the second conical portion. The second central opening 18 has the same diameter as the first central opening 8 and these two openings are preferably located coaxially with the longitudinal centre axis C of the separator tank unit. The innermost central area of the separator tank unit is thus open in the vertical direction from the upper part 6 down to the area above the second outlet 4. The cylindrical sidewall 16 extends in parallel with centre axis C between the curved end bottoms of the tank.

An outer or upper vortex flow takes place in the upper part 6 in the volume between the first inner annular wall and the cylindrical sidewall 16. Due to the rotational movement in the vortex flow, oil and gas has a tendency to concentrate at the outer surface of the first inner annular wall and rise upwards along it when bubbles have coalesced to sufficient size to be able to rise. In the vortex flow there is in addition to the rotating movement also a downward movement of water. At the lower end of the first inner annular wall the fluid can flow through a first flow opening 10 and into an intermediate volume 17 located between first inner annular wall 5 and second inner annular wall 15. Within intermediate volume 17 the fluid is in a vortex flow, and oil and gas present in the water concentrate in vicinity of the outer surface of the second inner annular wall. The vortex flow in the intermediate volume is very controlled because the volume is delimited by the inner annular walls that run in parallel at a significant portion of the intermediate volume. The second inner annular wall has a strong coalescing effect on the gas in the flow. In the vortex flow in the intermediate volume there is in addition to the rotating movement also a downward movement of water. At the lower end of the second inner annular wall the fluid can flow through a second flow opening 20 into the volume below the second inner annular wall. A lower vortex flow of mainly purified water is present in the lower part of the separator tank unit.

Inlet 7 for fluid in the separator tank unit is tangentially directed so that it ejects an inlet flow in a horizontal direction along the inside of cylindrical sidewall 16 with the effect that the inlet flow acts to rotate the fluid within the separator tank unit in a vortex flow. The rotational movement causes the lighter constituents such as oil drops and gas bubbles to be forced towards the centre of the tank. Due to the rotation and to gravitational effects oil and gas in the fluid tend to concentrate at the radial inner portion of the fluid flow, where oil and gas have a tendency to move in the upward direction, against a downward movement of the water. The first inner annular wall assists the upward movement of oil and gas in several manners. When the fluid flow meets the first inner annular wall oil and gas bubbles will coalesce, as described in the above, and become larger and thus obtain an increased tendency to rise due to lower density than the surrounding water. At the upper ends of the inner annular walls gas bubbles and oil can flow upwards in the central portion. The oil and gas collect at the upper surface of the fluid flow.

The tangential inlet flow may be obtained in several different manners. One possibility is to mount inlet pipe 25 so that it extends in tangential direction at the entry into the separator tank unit. Another possibility is to place a baffle plate at the inlet, so that the inlet flow is directed into the tangential direction irrespective of how the inlet pipe extends in vicinity of the inlet opening. The inlet pipe may e.g. extend in the radial direction into the separator tank unit and have a baffle plate mounted in front of the opening.

The first outlet 4 may be connected to a reject tank (not shown) via an outlet pipe 26. The first outlet 4 is associated with a flow rate control valve 23. If this valve is closed during operation, the separator tank unit will empty itself of water and be filled with gas. If valve 23 is fully opened during operation the flow rate through the first outlet will be large and the water content in the flow will typically be too high. Valve 23 is preferably set so that the water content in the outflow through outlet pipe 26 is low.

When a reject tank is utilized, oil, gas and water are once again allowed to separate, however here the oil content is high, especially in case the valve 23 is set with precision minimizing the water content and the operating conditions are stable. Oil is retracted from the reject tank via an oil line having a pressure control device in form of a pressure control valve, which is used to control the pressure in the reject tank and thus also the pressure at the first outlet 4. Alternatively, or when there is not a reject tank, a pressure control device 24 may be located in outlet pipe 26.

A means 12 for calming the flow around second outlet 3 can be cone-shaped (a Chinese hat) and supported with struts (not shown) to the end wall of the separator tank unit. The volume in the area above the cone-shaped means 12 is in flow connection with the area below the cone-shaped means 12 only through an annular space between outer rim of the cone-shaped means 12 and the inside surface of the sidewall or end wall of the unit. The downward flow of water thus has to pass this annular space in order to flow to second outlet 3. The vortex flow in the lower part of the unit is thus broken or significantly dampened, before the water exits through second outlet 3.

The pressure in the tank unit $P_t$ is maintained higher than the pressure Po in outlet pipe 26 that conveys the reject oil, gas, and if unavoidable also water. Preferably, the pressure difference Pt-Po is about 0.4 bar. The pressure Pt in the tank unit should preferably be higher than the pressure Pw in water outlet conduit 27, i.e. Pt>Pw, and suitably Pt is maintained at about 0.5 bar higher pressure than Pw. As an example, pressure control valves associated with the separator tank may be used to control the pressure differences, or it may alternatively be devices in the process systems upstream and downstream of the separator tank that set the pressures. This, however, makes the correct functioning of the separator tank very dependent on other systems. The second outlet 3 preferably has a pressure control valve 13 in the water outlet conduit 27. Downstream of pressure control valve 13 the pressure is Pw in water outlet conduit 27, and the pressure Pt in the tank unit is preferably higher than Pw.

The first outlet 4 in the upper part of the separator tank unit is located at a distance A from the top of the separator tank unit. This allows gas to build up in the uppermost portion of the unit. When gas has filled the volume above first outlet 4 and the gas level reaches down to the first outlet, then the gas flows into the outlet opening 14 and out through outlet pipe 26. The gas collected in the uppermost portion is much more compressible than the liquid/gas fluids present in the lower portions of the unit, and the collected gas may thus act as a cushion absorbing instant pressure variations in inlets and outlets to the separator tank unit. A certain volume of gas is required in order to achieve this effect during normal operation, and it is consequently preferred that the outlet opening is located in the range from 7 to 20% of the diameter of the cylindrical sidewall 16 below the upper end of the separator tank unit, and more preferably in the range from 10 to 15% of this diameter.

The gas comes from the mixture of water, oil and gas flowing into the unit via inlet pipe 25. Within the vortex flow in the unit the gas acts to collect oil and via coalescence the size of the gas bubbles increase and enables the bubbles to obtain such a large size that they are capable of rising up through the water flow and flotate in the uppermost area of the unit. Due to the overall conditions within the separator tank unit the liquid level in the unit has a tendency to fluctuate up and down as the pressure level in the gas decreases and increases. As the oil concentrates at the surface of the liquid, the fluctuations are preferably so small that mainly oil and gas flow out through the first outlet 4.

At ordinary operation gas build up takes place by accumulating gas until the gas has displaced the liquid part of the mixture in the tank to a level just below the first outlet. At this point gas and oil will be ejected through the second outlet and leave the separator tank unit. The level of the liquid mixture will rise to above the outlet for oil and gas and a new sequence of gas build up will take place. In this manner oil is automatically skimmed from the top of the water in the separator tank unit. In ordinary operation about 0.2%-3% of the fluids flowing into the unit via the inlet for fluid are flowing out via the first outlet.

Additional gas can be injected into the fluid flowing in the inlet pipe 25. Although the water will typically have an amount of gas coming from the reservoir from which the water has been withdraw, it is an advantage to supply additional gas that can be mixed with the fluid thereby increasing the ability of capturing oil particles within the fluid mixture. The gas used for gas injection may be any gas suitable for forming bubbles in the fluid, e.g. $CO_2$, nitrogen or a gas based on hydrocarbons. Preferably, the gas is recycled from the processes utilized for separating oil and gas from water. Such recycling may take place from the individual separator tank unit by providing a gas recycling conduit 102 leading from the uppermost portion of the volume within the unit to inlet pipe 25. The inlet pipe has a device 103 for adding gas (FIG. 10). If the device is of an ejector type it is on its own capable to draw gas from the unit. A flow rate control valve 104 may be present in conduit 102. Alternatively, a pump for increasing the gas pressure may be utilized in conduit 102, and then the gas may be injected through nozzle openings into the fluid flow in inlet pipe 25. In case the gas collects at the upper part of the unit at a higher rate than required for re-injection via conduit 102, gas may also be withdrawn via a gas outlet line 105 having a compressor 106 and/or a flow rate control device. The gas extracted via line 105 may be utilized in associated separator tank units.

The amount of gas added is typically in the range of 0.02 to 0.2 $St.m^3$ per 1 $m^3$ of fluid. Values in the range of 0.05 to 0.18 $St. m^3$ per 1 $m^3$ of fluid are preferred, but higher values for the amount of gas added can also be used, such as an amount of up to 0.3 $St.m^3$ per 1 $m^3$ of fluid. $St.m^3$ is standard cubic meters of the gaseous medium. $St.m^3$ is standardised within the offshore field (volume of dry gas at 15.6° C. and at a pressure of 101.325 kPa).

The dimensions of the separator tank unit are typically selected according to the amounts of water that should be treated. In test operation is has been found that the residence time in the separator tank unit could preferably be selected to be from 5 to 60 seconds, preferably 5 to 40 seconds, and more preferred from 8 to 35 seconds. When the residence time is set, and the desired capacity is known, the required efficient flotation volume can be calculated, and the calculation may be based on the assumption that a separator tank unit with an efficient flotation volume of 1 $m^3$ and a residence time for the liquid of 30 seconds has a capacity of 120 $m^3$ per hour. If the residence time is lowered then the capacity is proportionally increased, or the volume is proportionally decreased. If the capacity in increased and the residence time maintained then the volume has to be increased proportionally.

The gas is preferably dispersed in the fluid as tiny bubbles, such as by being injected into the fluid in the inlet duct via a nozzle device located only a short distance from the inlet opening in order to avoid the tiny gas bubbles merging to form bigger gas bubbles before entry into the separator tank unit. The gas injection is performed in the inlet pipe 25 preferably no more than from 5 to 40 cm from the inlet for fluid. The nozzle or nozzles for injection may in this case be located in a ring and the inlet pipe may have a flow restriction that causes turbulence in the flow within the pipe in order to improve the mixing of gas with the fluid.

The angle indicated with curved arrow E, between the vertical sidewall 16 and the upper side of the first conical portion 9 is preferably in the range between 15° and 70°, and suitably in the range from 20 to 50°.

FIG. 2 illustrates a cross section of the tank 1 taken along line II-II in FIG. 1. The incoming flow of fluid enters tank 1 via the tangentially arranged inlet 2 and substantially all of the feed circles around the first conical portion 9 before it may enter through first flow opening 10. A first circumferential angle F between the end of the inlet 2 and the beginning of first flow opening 10 is preferably in the range from 110-355° and more preferably in the range from 180-340°. The end of first flow opening 10 is preferably located at least 15° upstream of the beginning of the inlet 2 for fluid. A second circumferential angle G between the end of the first flow opening 10 and the beginning of second flow opening 20 is preferably in the range from 110-355° and more preferably in the range from 180-340°. The end of second flow opening 20 is preferably located upstream of the beginning of the first flow opening 10.

In the following description of other embodiments the same reference numerals are used for details of the same type, and only differences with respect to the above explanation are described.

In the embodiment of FIGS. 3 and 4 the first inner annular wall 5 has a first annular radial portion 11, which connects cylindrical sidewall 16 with the larger diameter end of first conical portion 9. In comparison with the first embodiment of FIG. 1, angle E is seen to be somewhat smaller and the inclination of the first conical portion steeper, but at the same time a larger volume is present for vortex flow around the lower end of the first conical portion. The first flow opening 10 is located in the first annular radial portion 11. The second inner annular wall 15 has a second annular radial portion 21, which connects cylindrical sidewall 16 with the larger diameter end of first conical portion 19. The second flow opening 20 is located in the second annular radial portion 21.

The tangential inlet in combination with the cylindrical sidewall of the tank provide for a formation of a vortex flow in the upper part of the tank and of a vortex flows in intermediate volume and in the lower part of the tank. It is preferred that the vortex flow does not form a vortex eye in the centre of the tank which eye is free of liquid mixture. The formation of a vortex eye is undesired because it may decrease the capacity of the unit. In order to avoid the formation of a vortex eye a rod-shaped, vertically extending vortex eye breaker can be mounted along the centre line of the separator tank unit. This is in principle known from WO 2007/049245. According to the present invention and the embodiment illustrated in FIG. 5 the pipe connecting outlet opening 14 with outlet pipe 26 comprises a length of central pipe 28 and a length of radial pipe 29 interconnected via a pipe bend. The central pipe 28 acts as a vortex eye breaker.

The embodiment of FIG. 6 is a multi-stage separator tank comprising two separator tank units arranged on top on one another. The two separator tank units are connected in series, i.e. the second outlet 3 for water in the upper separator tank unit is connected with the inlet 2 for fluid in the lower separator tank unit via an intermediate pipe 31. In this manner the water cleaned in the upper separator tank unit is cleaned even further in the lower separator tank unit, and a very compact design is obtained in view of the area required for the installation. An intermediate bottom 30 separates upper separator tank unit from the lower separator tank unit. The separator tank units are preferably analogously designed within the separator tank, however it is also possible to have separator tank units of different designs within the same separator tank.

The multi-stage separator tank may have an outer annular enclosure capable of being approved as a certified pressure vessel. A central area within annular enclosure may holds the separator tank units as illustrated in FIG. 6, and inside the annular enclosure the flow paths can be arranged for fluids conveyed into and out of the separator tank units.

It is possible to modify the embodiments within the contents of the appended patent claims, and details of the different embodiments may also be combined into other embodiments within the contents of the patent claims.

The separator tank may as an example be embodied with three separation steps, namely three separator tank units arranged on top of one another.

As a further alternative, one or both of the inner annular walls in the separator tank unit may be with a downward facing conical portions having the first central opening as the lowest portion of the first inner annular wall, and the second central opening as the lowest portion of the second inner annular wall.

Additives such as flocculants may also be added to the water before entering into the separator tank unit in order to improve the cleaning efficiency.

Because of the way the separator tank according to the invention is constructed with all surfaces vertical or having a steep inclination except for guide vane and vortex breaker and no narrow passages in the tank, there is no place in the separator, which is susceptible to clogging or deposition of solid materials. Therefore the separation of the well fluid at the production facility at the wellhead may be performed essentially continuously without or only with a minimal need for maintenance of the separator tank.

The high capacity combined with the minimum space requirements and the robustness of the separation tank in operation makes it particularly suited for use at offshore installations such as oil and gas production platforms. Furthermore, it is also well suited for use in oil and gas production located on the seabed, because at such a location the constraints on space may be even stricter than on traditional oil and gas production platforms and the capacity for maintenance may be lower. The separator tank is highly useful in oil and gas production both on-shore and offshore.

The separator tank 1 may treat an incoming flow of unclean water in form of a fluid mixture with a content of water of at least 96% and a content of oil and gas of at the most 4% in total. At the water outlet conduit 27, almost clean water may be delivered with less than 0.001% oil and gas content. Via outlet pipe 26, oil is recovered and may be delivered for addition to an oil production line.

Examples of use of the separator tank are described in the following.

EXAMPLE 1

In an embodiment as described with reference to FIGS. 1 and 2, the feed pressure in inlet pipe 25 is about 1.8 barg, and the pressure in the separator tank unit is about 1.3 barg, and the pressure in water outlet conduit downstream of pressure control valve 13 is about 0.8 barg. The pressure in outlet pipe 26 downstream of pressure control device 24 is maintained lower than the pressure in the separator tank unit, such as at about 0.9 barg. It is an advantage to use as low pressure as possible in the unit, because the gas in the water will evaporate to a larger extent, when the pressure is lower. This will on the one hand provide gas bubbles for use in the separator tank, and on the other hand the water is cleaned of the gas content and is thus better purified.

EXAMPLE 2

Three separation tank units 1, 1' and 1" of the design as described in FIGS. 1 and 2 were interconnected as illustrated in FIG. 7. The first outlet 4 of tank 1 is for oil and gas and is connected to the inlet 2' on tank 1'. Likewise, the second outlet 3 of tank 1 is for water and is connected to the inlet 2" on tank 1". The water to be purified is lead to tank 1 via inlet 2. In tank 1 the fluid is separated into a gas and oil phase and a water phase. The gas and oil phase is taken out from tank 1 via first outlet 4 and lead to tank 1' via inlet 2'. The water phase is taken out from tank 1 via second outlet 3 and lead to tank 1" via inlet 2". In tank 1' the gas and oil phase is separated into gas, which leaves tank 1' via first outlet 4', and oil, which leaves tank 1' via second outlet 3'. In tank 1" the water phase is separated into water and oil/gas. The oil/gas leaves tank 1" via first outlet 4", and cleaned water leaves tank 1" via second outlet 3". In order to improve the separation in the tank 1" further gas may be injected at inlet 2" into the incoming well fluid stream from the second outlet 3. The gas for injection may be a part of the recovered gas from first outlet 4', as indicated by the broken line 114. The two tanks 1 and 1" are provided with a conduit 102 connecting the gas zone in the tank with an eductor in the inlet 2 and inlet 2", respectively. Optionally tank 1' may also be provided with such a conduit 102.

By the described arrangement a fluid from a well head comprising oil, gas and water is very effectively separated into an oil phase, a gas phase and a water phase, where the stream of cleaned water leaving tank 1" via the second outlet 3" has been cleaned twice.

EXAMPLE 3

In this example the water is purified in a three-step process. Three separator tanks 1, 1', and 1" are connected in series as illustrated in FIG. 8. An inlet flow of water is supplied to inlet 2, and an oil and gas phase is taken out via outlet pipe 26, and purified water is taken out via water outlet conduit 27. Intermediate pipe 31 connects the second outlet 3 on tank 1 with inlet 2' on tank 1'. Intermediate pipe 31' connects the second outlet 3' on tank 1' with inlet 2" on tank 1". The tanks 1, 1' and 1" are provided with a conduit 102 connecting the gas zone in the tank with an eductor in the inlet 2, inlet 2', and inlet 2", respectively. The three-step purification of the water results in very low levels of oil and gas in water outlet conduit 27. There is a flow rate control valve and a pressure control device for each individual first outlet 4, 4' and 4".

EXAMPLE 4

FIG. 9 schematically depicts an arrangement where two separator tanks 1 and 1' according to the invention are used in parallel in order to increase the overall capacity. Water enters tanks 1 and 1' at inlets 2 and 2'. An oil/gas phase is taken out at outlet pipe 26, and cleaned water is taken out at water outlet conduit 27. The tanks 1 and 1' are provided with a conduit 102 connecting the gas zone in the tank with an eductor in the inlet 2 and inlet 2', respectively. A single flow rate control valve is provided for the individual first outlet 4, 4', whereas a single the pressure control device is used in common for the individual first outlets 4, 4'.

The invention claimed is:

1. A separator tank for separating oil and gas from water, and comprising an essentially cylindrical vertical tank with at least one separator tank unit, which separator tank unit has an inlet for fluid and a first inner annular wall, at least one first outlet in an upper part of the separator tank unit, and at least one second outlet in a lower part of the separator tank unit; said inlet for fluid being tangentially directed along the inside of a cylindrical sidewall of the tank; and said first inner annular wall extending from the cylindrical sidewall of the tank and having a first conical portion and a first central opening at an end of said first inner annular wall and a first flow opening at the lower end of the first inner annular wall, wherein the separator tank unit has a second inner annular wall positioned in the separator tank unit at a distance from the first inner annular wall and extending from the cylindrical sidewall of the tank, which second inner annular wall has a second conical portion, a second central opening at an end of the second inner annular wall, and a second flow opening at the lower end of the second inner annular wall, and wherein a conical annular intermediate volume is present in between the first conical portion and the second conical portion, fluid being able to flow through the first flow opening and into said intermediate volume.

2. The separator tank according to claim 1, wherein the first inner annular wall has a first annular radial portion extending from the first conical portion to a cylindrical sidewall of the separator tank unit.

3. The separator tank according to claim 1, wherein the second inner annular wall has a second annular radial portion extending from the second conical portion to the cylindrical side wall.

4. The separator tank according to claim 2, wherein the second inner annular wall has a second annular radial portion extending from the second conical portion to the cylindrical side wall.

5. The separator tank according to claim 2, wherein the first flow opening is located in the first annular radial portion.

6. The separator tank according to claim 3, wherein the second flow opening is located in the second annular radial portion.

7. The separator tank according to claim 1, wherein the first flow opening is located in the first conical portion.

8. The separator tank according to claim 1, wherein the second flow opening is located in the second conical portion.

9. The separator tank according to claim 1, wherein the first and second inner annular walls are substantially identical in size and shape.

10. The separator tank according to claim 1, wherein in a circumferential direction the first flow opening is positioned in the range from 110 to 355° downstream after the inlet for fluid.

11. The separator tank according to claim 10, wherein in the circumferential direction the second flow opening is positioned in the range from 110 to 355° downstream after the first flow opening.

12. The separator tank according to claim 1, wherein a baffle plate is mounted at a distance from the second flow opening.

13. The separator tank according to claim 1, wherein a baffle plate is mounted at a distance from the second flow opening, which baffle plate is an annular ring extending in radial direction from the side wall.

14. The separator tank according to claim 1, wherein a vertical distance between the first inner annular wall and the second inner annular wall is less than a vertical extension of the second inner annular wall.

15. The separator tank according to claim 2, wherein a vertical distance between the first inner annular wall and the second inner annular wall is in the range from 0.5 to 5 times the radial width of the first annular radial portion.

16. The separator tank according to claim 1, wherein the second inner annular wall is fixed to the cylindrical sidewall of the tank at a position located at a distance above a bottom of the tank in the range of $1/6$-$1/2$ of the total inner height of the tank.

17. The separator tank according to claim 16, wherein the second inner annular wall is fixed to the cylindrical sidewall of the tank at a position located at a distance above the bottom of the tank in the range of $1/5$ to $2/5$ of the total inner height of the tank.

18. The separator tank according to claim 1, wherein the separator tank unit has a flow rate control valve for controlling flow from the first outlet.

19. The separator tank according to claim 1, wherein a pressure control device controls the pressure at the first outlet to be lower than the pressure at the second outlet.

20. A separator tank for separating oil and gas from water, and comprising an essentially cylindrical vertical tank with at least one separator tank unit, which separator tank unit has an inlet for fluid and a first inner annular wall, at least one first outlet in an upper part of the separator tank unit, and at least one second outlet in a lower part of the separator tank unit; said inlet for fluid being tangentially directed along the inside of a cylindrical sidewall of the tank; and said first inner annular wall extending from the cylindrical sidewall of the tank and having a first conical portion and a first central opening at an end of said first inner annular wall and a first flow opening at the lower end of the first inner annular wall, wherein the separator tank unit has a second inner annular wall positioned in the separator tank unit at a distance from the first inner annular wall and extending from the cylindrical sidewall of the tank, which second inner annular wall has a second conical portion, a second central opening at an end of the second inner annular wall, and a second flow opening at the lower end of the second inner annular wall, wherein a conical annular intermediate volume is present in between the first conical portion and the second conical portion, fluid being able to flow through the first flow opening and into said intermediate volume, and wherein in a circumferential direction the second flow opening is positioned in the range from 110 to 355° downstream after the first flow opening.

21. The separator tank according to claim 20, wherein the first and second inner annular walls are substantially identical in size and shape.

22. The separator tank according to claim 20, wherein the second inner annular wall is fixed to the cylindrical sidewall of the tank at a position located at a distance above a bottom of the tank in the range of ⅙-½ of the total inner height of the tank.

23. The separator tank according to claim 20, wherein a vertical distance between the first inner annular wall and the second inner annular wall is less than a vertical extension of the second inner annular wall.

24. A separator tank for separating oil and gas from water, and comprising an essentially cylindrical vertical tank with at least one separator tank unit, which separator tank unit has an inlet for fluid and a first inner annular wall, at least one first outlet in an upper part of the separator tank unit, and at least one second outlet in a lower part of the separator tank unit; said inlet for fluid being tangentially directed along the inside of a cylindrical sidewall of the tank; and said first inner annular wall extending from the cylindrical sidewall of the tank and having a first conical portion and a first central opening at an end of said first inner annular wall and a first flow opening at the lower end of the first inner annular wall, wherein the separator tank unit has a second inner annular wall positioned in the separator tank unit at a distance from the first inner annular wall and extending from the cylindrical sidewall of the tank, which second inner annular wall has a second conical portion, a second central opening at an end of the second inner annular wall, and a second flow opening at the lower end of the second inner annular wall, and wherein in a circumferential direction the second flow opening is positioned in the range from 110 to 355° downstream after the first flow opening.

25. The separator tank according to claim 24, wherein the first and second inner annular walls are substantially identical in size and shape.

26. The separator tank according to claim 24, wherein the second inner annular wall is fixed to the cylindrical sidewall of the tank at a position located at a distance above a bottom of the tank in the range of ⅙-½ of the total inner height of the tank.

27. The separator tank according to claim 24, wherein the separator tank unit has a flow rate control valve for controlling flow from the first outlet.

28. The separator tank according to claim 24, wherein a pressure control device controls the pressure at the first outlet to be lower than the pressure at the second outlet.

29. The separator tank according to claim 24, wherein a baffle plate is mounted at a distance from the second flow opening, which baffle plate is an annular ring extending in radial direction from the side wall.

* * * * *